United States Patent

Matiere

[11] Patent Number: 5,449,020
[45] Date of Patent: Sep. 12, 1995

[54] ELONGATED ENCLOSURE OF LARGE CROSS-SECTION, AND PROCESS FOR ITS MANUFACTURE

[76] Inventor: Marcel Matiere, 15000 Aurillac - 17 Avenue, Aristide Briand, France

[21] Appl. No.: 989,788

[22] Filed: Dec. 7, 1992

Related U.S. Application Data

[63] Continuation-in-part of Ser. No. 772,242, Oct. 7, 1991, Pat. No. 5,180,254.

[30] Foreign Application Priority Data

Dec. 24, 1991 [FR] France ................... 91 16128

[51] Int. Cl.$^6$ ................................ F16L 9/04
[52] U.S. Cl. ........................ 138/103; 138/105; 405/154; 405/157
[58] Field of Search ............ 52/79.4, 80.1, 86, 87, 52/294; 138/105, 172, 174, 175, 106; 405/124, 126, 154, 157

[56] References Cited

U.S. PATENT DOCUMENTS

| | | | |
|---|---|---|---|
| 925,019 | 6/1909 | Parks | 405/126 |
| 1,541,918 | 6/1925 | Brennan | 138/105 |
| 2,857,648 | 10/1958 | March | 138/105 |
| 3,508,406 | 4/1970 | Fisher | 138/105 |
| 3,734,137 | 5/1973 | Stanley | 138/105 |
| 5,061,121 | 10/1991 | Matiere | 138/105 |

FOREIGN PATENT DOCUMENTS

| | | | |
|---|---|---|---|
| 589745 | 11/1933 | Germany | 138/105 |
| 2121851 | 1/1984 | United Kingdom | 52/80.1 |

*Primary Examiner*—David A. Scherbel
*Assistant Examiner*—Terrence R. Till
*Attorney, Agent, or Firm*—Pollock, Vande Sande & Priddy

[57] ABSTRACT

An elongated enclosure designed to withstand internal pressure which may exceed 10 bars and forming a sealed, fluid-tight tubular space having a truncated transverse section, the enclosure comprising a lower part formed by a rigid concrete slab resting on the ground and an upper part constituted by a thin metal wall in the shape of a curved arch extending between two lateral ends parallel to the longitudinal axis and connected to the slab, each of which is attached by a longitudinal junction piece connected tangentially to the lateral end of the arch. The upper face of the slab has a width substantially equal to the space between the two lateral ends, and each junction piece is constituted by a flat plate extending within the extension of the arch and pressed from the outside against the corresponding lateral face, each plate being linked to a position-maintenance arrangement capable of preventing this plate from shifting along the corresponding lateral face of the slab under the effect of forces generated by internal pressure, and of preventing detachment of these plates under the effect of external forces.

3 Claims, 6 Drawing Sheets

ELONGATED ENCLOSURE OF LARGE CROSS-SECTION, AND PROCESS FOR ITS MANUFACTURE

CROSS-REFERENCE TO RELATED APPLICATION

This is a continuation-in-part of U.S. patent application Ser. No. 07/772,242, filed Oct. 7, 1991 now U.S. Pat. No. 5,180,254.

FIELD OF THE INVENTION

The present invention relates to an elongated enclosure having a large transverse cross-section and capable of supporting high internal pressure, which may, potentially, exceed 10 bars, as well as external forces. The invention is applicable, more specifically, to the construction of a pressurized fluid-transfer pipework system intended to be built in the open air or, as the case arises, buried beneath a fill.

Generally speaking, the invention can be made applicable to the construction of any pipework system allowing a high pressurized fluid-transfer flow rate, e.g., to the building of sanitation or water-piping systems, urban heating, or pressure pipelines used to supply hydroelectric plants.

BACKGROUND OF THE INVENTION

Fluid-transfer pipelines are normally constructed using sections of metal tubes having a circular cross-section and laid end to end and connected in a fluid-tight manner.

It is known, in fact, that a thin circular metal wall can withstand appreciable internal pressures. Accordingly, for reasons of manufacturing economy and transport, pressurized pipelines are made of metal, at least on all occasions when external excess loads are not appreciable, e.g., in the case of pressure pipelines. However, when the lines are laid, a pipe incorporating a thin metal wall can become out of round because of its own weight, thereby hindering welding. This phenomenon then requires installation of stiffening elements which complicate construction, add weight to the pipeline, and, if these elements are left in place, form obstacles to fluid circulation.

In many cases, e.g., in sanitation or water-piping networks, the pipeline is placed on the bottom of a ditch and buried beneath a fill. The ditch is normally filled before pressurization of the pipe, which in this empty state, is thus subjected to the exterior forces generated by the fill and to potential over loads. After operational start-up, these external forces are counterbalanced by the internal pressure, which may vary, however, and can sometimes be absent. In all of these cases, the load pressing on the line can draw the pipe out of round and even crush it.

For this reason, buried pipelines are habitually made either of metal tubes possessing rather substantial thickness and incorporating exterior stiffening elements, or reinforced concrete tubes, which may or may not be pre-stressed.

Nevertheless, the transport and installation of these tubes requires limiting their dimensions and, consequently, the cross-section of flow, their diameter not exceeding, in practice, 2.5 meters, in order to remain within the highway gauge.

To solve this problem, proposals have already been advanced for constructing buried, large cross-section pipelines by utilizing assembled metal panels which normally have an undulated profile which enables them to better withstand external over loads and differential settling phenomena. However, these structures are not equipped to withstand an internal pressure, and there is a degree of risk that the pipeline will be crushed under the effect of external loads.

To build large cross-section pipelines capable of withstanding simultaneously an internal pressure and external excess loads, the same inventor has previously proposed, in Patent No. U.S. Application No. 5,061,121 or U.S. patnet Ser. No. 07/772,242, construction of a mixed-type tubular enclosure having a truncated cylindrical section and comprising, in cross-section, a lower part in the form of a massive slab made of reinforced concrete and an upper part shaped like an inward-curved arch formed by a thin metal wall whose two lateral ends are attached, respectively, to the concrete slab, each end being connected by a junction piece cemented to the upper face of the flat slab and being joined tangentially to the corresponding lateral end of the arch.

This mixed construction allows optimal use of materials.

In fact, when the pipeline is pressurized, the metal arch is subjected solely to traction stresses and can be made from rather thin thin-walled elements which are easily maneuvered and welded together so as to ensure fluid-tightness under pressure.

Furthermore, because of the truncated cross-section at its base, the upper metal part effectively withstands external forces, even when the line is empty, by virtue of an arch effect. The flat base, which acts as a stiffening element, is subjected to flective stresses, yet can withstand them under favorable conditions, because this base is formed from a concrete slab whose thickness and iron framework can be determined as a function of the stresses it supports. Moreover, this flat base gives the pipeline an effective foundation surface, which makes it possible to spread out the stresses applied on the ground and to withstand differential settling phenomena.

The slab may advantageously be poured at the site as the work progresses, or it may be formed from prefabricated elements laid down in succession.

In U.S. Pat. No. 5,061,121 and U.S. patent application No. 07/772,242, previously cited, the metal arch is connected to the slab along its two lateral edges by means of shaped sections comprising an upper part attaching tangentially to the arch, and a lower part cemented to the upper face of the slab in such a way as to make it possible to withstand tearing stresses and, at the same time, provide fluid-tightness.

This attachment method is well adapted to the case in which the slab is made of prefabricated elements. However, it can complicate construction when the slab is poured on site. Furthermore, when strong internal pressures are generated, it may be feared that the concrete will ultimately crack as a result of the stresses generated.

SUMMARY OF THE INVENTION

Thus, the purpose of the invention consists in new arrangements which allow simplification of the method for attachment of the metal arch, reduction of the risks of cracking of the concrete, and lightening of the slab. Furthermore, construction of the pipeline in its entirety can be considerably simplified by implementing these new configurations.

Accordingly, the invention is generally applicable to an elongated enclosure of the type described in Patent No. U.S. application No. 5,061,121 or Application Ser. No. 07/772,242 and constituted by a lower part formed from a rigid concrete slab comprising a lower face resting on the ground, an upper face, and two lateral faces parallel to the longitudinal axis, and by an upper part constituted by a thin metal wall shaped like an inward-curved arch extending between two lateral ends parallel to the longitudinal axis and attached to the slab, each of which is fastened by means of a longitudinal junction piece having an upper part which attaches tangentially to the lateral end of the arch and a lower part attached to the slab.

In accordance with the invention, the upper face of the slab has a width substantially equal to the space between the two lateral ends of the inward-curved arch, and each junction piece is constituted by a flat plate pressed from the outside against the corresponding lateral face of the slab and associated with position-maintenance means capable of preventing shifting of this plate along the corresponding lateral face of the slab when acted upon by stresses caused by internal pressure, and of preventing detachment of these plates when acted upon by external forces.

To optimally withstand both external forces and internal pressure, the arch preferably covers substantially a half-circle centered more or less at the level of the upper face of the slab.

However, to provide for a wide cross-section of transport without increasing the width of the slab exaggeratedly, advantage may be gained by giving the arch an angle at center of more than 180°. In this case, the two lateral faces of the slab may be inclined in relation to the upper horizontal face by an angle corresponding to the orientation of the tangent at the point of origin of the arch, so as to allow positioning of the two lateral arch-attachment plates within the extension of this arch.

The longitudinal attachment plates are preferably pressed against the lateral faces of the slab under a pressure sufficient at least to prevent, by means of friction, the shifting of the plate.

However, to improve resistance to bending of the slab and to make it lighter, advantage is gained by subjecting it to transverse pretensioning stresses.

In this case, the two longitudinal plates used to attach the arch to the slab can be connected by a multiplicity of transverse bars spread out over the entire length of the enclosure, each of which extends over the entire width of the slab while passing through the two plates and the slab, each bar being fitted at each end with an external means allowing it to be supported on the corresponding plate, these bars being subjected to a prestressing tension capable of allowing, simultaneously, the slab to withstand the stresses generated by internal pressure and each attachment plate to be pressed against the corresponding lateral face of the slab under a pressure sufficient to prevent shifting of the plate.

To ensure fluid-tightness, the tubular enclosed space is, preferably, bounded in its entirety by metal walls welded together. In this case, the two lateral ends of the arch are attached to each other by means of a thin transverse plate covering one of the horizontal faces, the upper or lower respectively, of the slab, and incorporating two parallel, longitudinal edges attached rigidly and in fluid-tight fashion, along each lateral end, respectively, of the arch.

This transverse plate thus provides, simultaneously, for fluid-tightness and for position-retention of the longitudinal plates, in particular to prevent them from being spread apart under the effect of external forces.

To improve resistance to the effects of shifting, each attachment plate can advantageously be equipped, on its interior face turned toward the slab, with at least one projecting fastening element, such as a rib, which cooperates with at least one paired, hollowed element, such as a groove cut in the desired location on the corresponding lateral face of the slab.

In the event that the slab is poured on site and thus forms a continuous surface, fluid-tightness may be potentially provided by the upper face of the slab itself. A fluid-tightness cord will then be interposed between each attachment plate and the lateral face of the slab against which it is pressed.

The arch is thus constituted by prefabricated sections placed in succession one after the other and, in a first embodiment, each arch section comprises a central part shaped like a half-shell forming the arch itself and extended, on each side, by a substantially flat portion forming the attachment flange, each half-shell forming, along with its two flange, a one-piece element covering the transverse cross-section in its entirety.

However, in another embodiment, the arch may also be constituted by at least three prefabricated components, , i.e., at least one curved, arch-shaped central element and two lateral elements, respectively, each of which comprises a flat lower part forming the attachment plate, and an upper part capable of tangential attachment to one lateral edge of the central element and fastened to the latter by means of a continuous weld.

It will be noted that this upper part of the plate, which projects beyond and above the level of the upper face of the slab, advantageously constitutes a centering edge of the arch component.

The two longitudinal plates can be fastened in advance to a transverse plate, so as to form a prefabricated unit that can be positioned separately on the slab, the arch component then being attached to the upper edges of the two longitudinal plates.

The transverse plate may, moreover, comprise two separate welded elements, respectively, each of which is on one of the lateral elements and extends toward the other while partially overlapping, so as to draw the lateral elements slightly closer together when they are attached to the slab and undergo prestressing, the two parts of the transverse plate being welded after stabilization.

This elongated enclosure may be produced in different ways.

According to a first procedure proving especially advantageous, after having dug a ditch over a determinate length and formed a levelled, close-packed bottom, a continuous reinforced concrete or prestressed slab is made on this bottom as work progresses; this slab can be poured on site between two flat formworks whose spacing, at least at the level of the upper face of the slab, is substantially equal to the space between the lateral ends of the circular sector. To produce each section of the upper metal part, two longitudinal plates, which are welded to the ends of the plates already laid in position, are pressed against the lateral faces of the slab, and the arch section is put in place by welding it, first, along the transverse joint formed in conjunction with the section previously laid, and second, to the upper ends of the longitudinal plates.

Special advantage is gained by using, as formwork, the longitudinal plates, which are then laid simultaneously with the iron framework while resting on it, the concrete slab being poured between these plates.

In the more typical case in which the slab is covered with a transverse plate, this plate can be welded in advance to two of the longitudinal plates so as to produce a junction assembly that can be laid on the slab and can slide along it until it comes into contact with the assembly previously laid, to which it is welded.

However, this junction assembly can also be used as a formwork in which the corresponding part of the slab, which is then formed from prefabricated elements placed in succession one after the other, is molded, each element being constituted by a junction assembly associated with one slab element. To make a new section of the enclosure, a slab element is first laid by aligning it with the part already laid, the facing edges of the longitudinal and transverse plates are welded, and then the arch component is laid on the corresponding assembly and welded along its lateral edges to the longitudinal plates, and along a transverse joint connecting with to the adjacent arch component previously put in place.

However, another advantageous embodiment proves possible when the metal portion of the enclosure is constituted by prefabricated sections, each of which comprises a curved wall extended by two longitudinal plates and whose lower edges are connected by a transverse plate. In this case, in fact, after having dug the ditch, the metal sections are laid one after the other, each resting on the installation surface by means of the transverse plate forming its lower part; then, these sections are welded together, at least over a certain length, and the concrete slab is poured inside the enclosure, within the formwork formed by the lower portion of this enclosure.

This embodiment may, again, be perfected by connecting the two longitudinal plates by means of two transverse walls fastened along the lower edges and along the upper ends, respectively, of the longitudinal plates. The assembly formed by the two transverse walls and the two longitudinal plates thus forms a metal box having a closed cross-section, which is filled with concrete in order to produce the slab, this slab being reinforced by the metal wall of the aforementioned box.

Each time it proves feasible, the worksite will be equipped with a bending press which makes possible the on-site manufacture of the arch components, the sheet-metals thus being transported flat. This bending press can, moreover, be laid on the previously concreted slab.

DESCRIPTION OF THE DRAWINGS

Understanding of the invention will be enhanced by virtue of the detailed description of several embodiments, provided by way of example and illustrated in the attached drawings.

DESCRIPTION OF THE PREFERRED EMBODIMENTS

Figure 1:
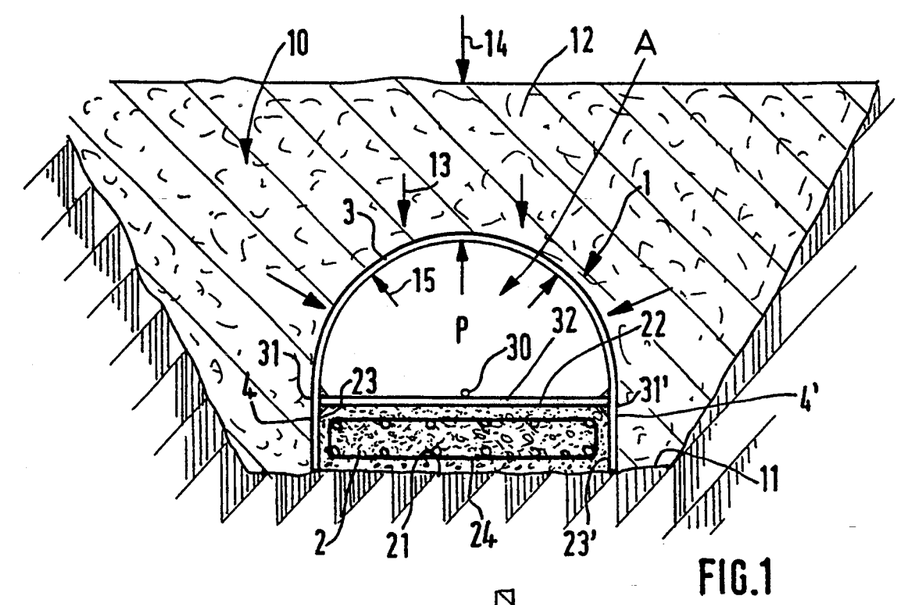
FIG. 1 is a schematic transverse cross-section of an elongated enclosure according to the invention.

FIG. 1 illustrates, diagrammatically and in transverse cross-section, an elongated enclosure 1 placed in a ditch 10 and resting on the levelled, close-packed bottom 11 of the latter, the enclosure being covered by a fill 12 after installation.

The enclosure 1 is constituted by two parts, a lower part 2 formed by a rigid, flat slab normally made of reinforced or prestressed concrete, and an upper part 3 formed by a thin metal wall shaped like a cylindrical arch delimiting, in conjunction with the slab, a tubular space A having a truncated, circular cross-section, in which a fluid under high pressure P, e.g., greater than 10 bars, can circulate.

As will be seen below, the rigid slab 2 is preferably poured in place as construction progresses, but it can also be formed from prefabricated elements laid end to end.

The upper part 3 is constituted by elements of the thin metal wall, which form sections laid in succession.

Each section is shaped like an arch curved in an arc of a circle between two lateral ends 31, 31' extended tangentially by two flat plates 4, 4'.

Preferably, but in a non-restrictive fashion, the arch 3 covers a half-circle.

The slab 2, which rests on the ground by means of its lower face 21, is bounded by an upper, horizontal face 22 and two lateral faces 23, 23' parallel to the axis of the enclosure.

In the most widely-implemented embodiment, the lateral faces 23, 23' are vertical. However, other arrangements are possible, as will be seen below.

According to the basic characteristic of the invention, the width of the upper face 22, which corresponds to the spacing separating the lateral faces 23, 23', equals the distance between the lateral ends 31, 31' of the cylindrical arch 3, that is, in the example illustrated, the diameter of the circular section.

Accordingly, the two longitudinal plates 4, 4', which extend the arch 3 downward, can be pressed from the outside against the lateral faces 23, 23', to which they are attached.

Under the effect of radial forces 15 created by internal pressure P, the arch 3 is subjected to traction stresses, which are absorbed at the lateral ends 31, 31' by the plates 4, 4'. These plates can thus be attached to the slab 2 using means making it possible simply to withstand the shift forces exerted along the lateral faces 23, 23' of the slab when the enclosure is pressurized.

Furthermore, by virtue of an arch effect, the upper part 3 effectively withstands the external forces 13 generated by the fill 12 or over loads, even when internal pressure is absent. It is necessary simply to keep the spacing separating the lateral ends 31, 31' of the arch 3 uniform; this can be easily obtained using a thin plate 32 covering the upper face 22 of the slab 2, whose lateral edges are welded to the ends 31, 31' of the arch. The horizontal plate 22 forms, in conjunction with the longitudinal plates 4, 4', a box that can be fastened to the slab 2 by means of anchoring devices spread out over the entire surface.

The reinforced concrete slab 2, which stiffens the enclosure 1, is especially well suited to withstanding the flexure which it is subjected. It is sufficient, in fact, to determine the size characteristics and the framework of the slab as a function of the forces resulting from the internal pressure.

Figure 2:
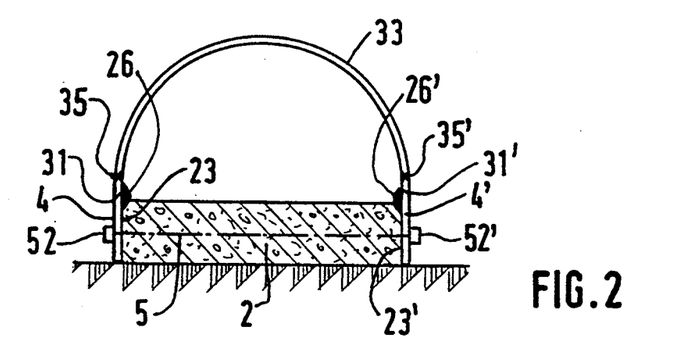
FIG. 2 is a transverse cross-section of another embodiment.

To better withstand the shift forces by increasing friction, the longitudinal plates 4, 4' can be pressed against the lateral faces 23, 23' of the slab by applying a certain pressure. To this end, as illustrated in FIG. 2, advantage is gained by connecting the two longitudinal plates 4, 4' by means of a multiplicity of tension bars 5, which extend over the entire width of the slab 2 and whose ends 51, 51' pass through the longitudinal plates 4, 4', and which are fitted with enlarged heads 52, 52' which, from the outside, are supported on the two plates 4, 4'. Thus, by putting the bars 5 under tension, the longitudinal plates 4, 4' are forcefully pressed against the lateral faces 23, 23' of the slab 2.

The tension of the bars 5 may simply be sufficient to fasten the arch 3 to the slab 2 because of the friction generated, and thus, to withstand the tendency toward detachment and lifting of the arch under the action exerted by the internal pressure P.

Moreover, in the absence of pressure, the bars 5 resist the tendency toward separation of the lateral ends 31, 31' under the effect of external forces 13 exerted by the fill 12, and they ensure maintenance of the half-circular shape of the wall 3, which thus withstands buckling and the tendency to go out of round under the loads generated by the fill.

However, the bars 5 may also form prestressing bars placed under a tension sufficient to allow the slab 2 to withstand the flexure stresses to which it is subjected under the action exerted by internal pressure P. Because of this prestressing, it becomes possible to lighten the slab 2 and its framework 24 substantially.

Figure 3:
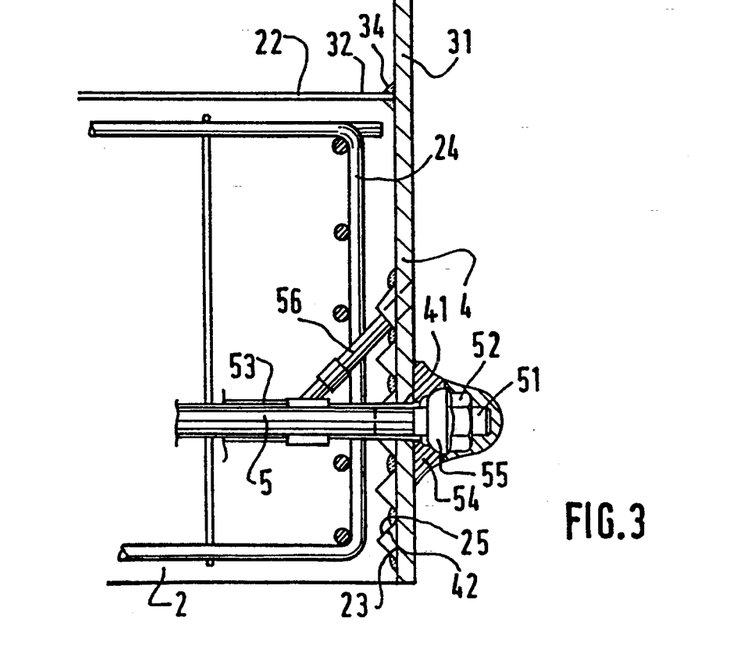
FIG. 3 is a detail view on an enlarged scale of the attachment of a plate by prestressing.

Prestressing of the slab 2 can be effected conventionally, e.g., as shown in detail in FIG. 3. Each bar 5 extends, while allowing play, inside a duct 53 provided within the thickness of the slab 2 perpendicularly to the two lateral faces 23, 23' of this slab. Each end 51 of a bar 5 passes through the corresponding plate 4 by means of a hole 41 drilled for that purpose, and is threaded so as to allow a nut 52 supported on the plate 4 to be screwed by means of a toric element 53 and a support element 54, both having paired shapes.

Using conventional means, the bars 5 are put under the desired prestressing tension and are immobilized by means of the nuts 52, then, by means of an air duct 56 provided for that purpose, a cement grout is injected into the duct 53 so as to attach the prestressing bars to the slab 2.

In this case, the iron framework 24 acts basically to allow manipulation of the slab when the latter is constituted by prefabricated elements and to avoid the risk of cracking, especially under the effect of prestressing.

In this way, first, the perfect attachment of the arch 3 to the slab 2, and, second, a rigidity of the slab sufficient to withstand the flexure stresses without requiring increased thickness of the slab or increased size of the iron framework are ensured.

To improve the attachment between the plates 4, 4' and the slab 2, each plate 4, 4' is preferably fitted, on its interior surface turned toward the slab, with projecting elements constituted, for example, by welded angle brackets 42 which fit into matching grooves 25 provided on the lateral faces 23, 23' of the slab. Furthermore, in the area of each prestressing bar, the plate 4 is fitted with a reinforcement element 43 which surrounds the hole 41 and penetrates into a corresponding housing provided on the lateral face 23 of the slab.

It must be noted that the use of projecting fastening pieces to counteract the tendency to shift of the attachment plates 4, 4' will prove useful in all cases, even when the attachment plates are simply pressed, in the absence of pressure, against the lateral faces of the slab.

When the slab is poured on site, it can of itself form a continuous face sealing the enclosure, if the circulating fluid does not attack the concrete and if the quality of the latter makes it possible to ensure fluid-tightness. It is then sufficient, as illustrated in FIG. 2, to insert fluid-tightness 26 between the longitudinal plates 4, 4' and the lateral faces 23, 23' of the slab 2, in which case the joints are tightened by the simple pressing the longitudinal plates 4, 4' under pressure.

Most often, however, the sealed tubular fluid-circulation space is preferably bounded in its entirety by welded metal walls, according to the configuration shown in FIG. 1. The slab 2 is then covered with a transverse plate 32 welded to the lateral ends of the arch 3. Fluid-tightness is thus easily achieved, since the wall is welded in its entirety, and contact between the concrete and the circulating fluid is avoided.

Because the plate 32 is pressed against the slab 2 by means of pressure P, it can form a simple thin fluid-tight, as indicated in FIG. 3.

It will be noted that it is not indispensable to use prestressing bars 5, since preservation of the space separating the lateral ends 31, 31' can be ensured using only the plate 32. The longitudinal plates 4, 4' can then be attached to the lateral faces 23, 23' of the slab 2, for example by using anchoring bolts allowing the plates 4, 4' to be pressed on the lateral faces 23, 23' by means of a pressure sufficient simply to provide, by means of friction, for preserving the shape of the arch 3, while preventing the ends 31, 31' of the arch 3 from being raised.

In particular, if the longitudinal plates 4, 4' are fitted with fastening means such as the projecting elements 42, it is sufficient to keep uniform the space separating them so as to ensure the attachment of the arch 3 to the slab 2.

Figures 4, 5, 6:
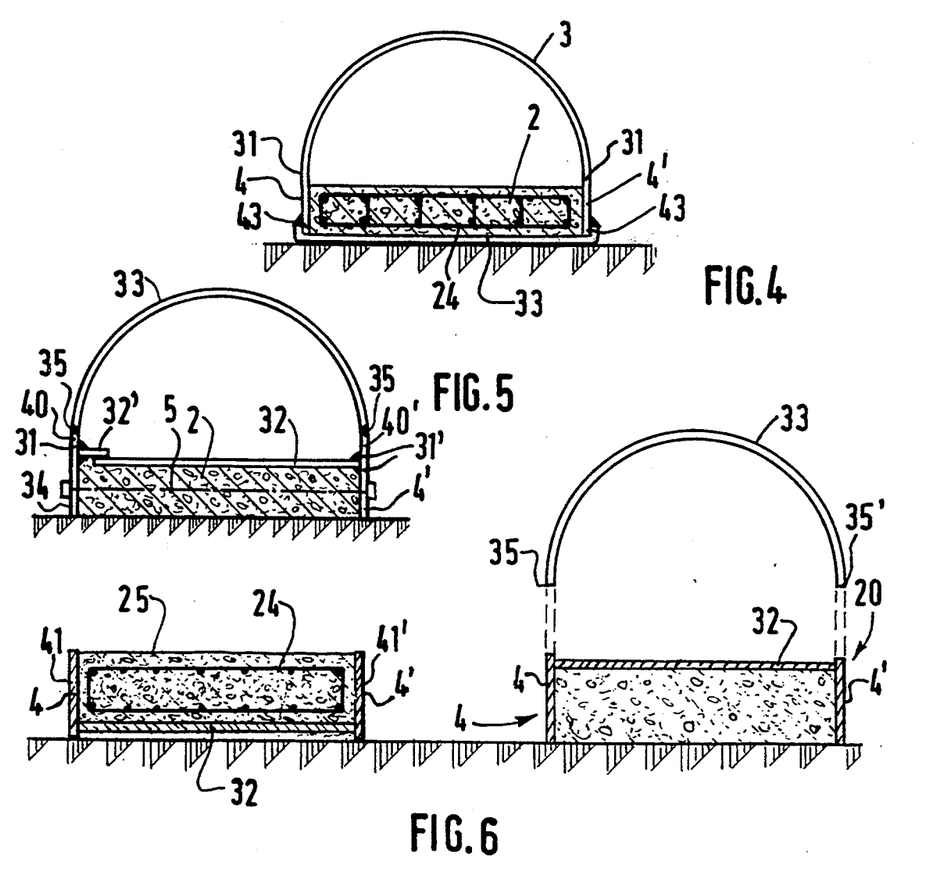
FIGS. 4 and 5 are schematic transverse cross-sections of other embodiments of an enclosure according to the invention.
FIG. 6 illustrates, in two steps, the manufacture of a prefabricated lower component.

However, the spacing separating the longitudinal plates 4, 4' must match exactly the spacing of the lateral faces 23, 23' of the slab. Contact can be achieved by means of adjustment wedges; however, it is more advantageous, as indicated in FIG. 5, to make the transverse plate 32 in two parts, one part 32 extending substantially over the entire width of the slab 2 but welded on only one side to one of the longitudinal plates 4', and a second part 32' welded by one side to the other longitudinal plate 4 and having a width such that its other side overlaps the end of part 32. Accordingly, the two plates 4, 4' associated with the two parts 32', 32, respectively, are easily positioned on the slab 2, and can potentially be brought closer together to allow the plates 4, 4' to be pressed on the faces 23, 23'; then, after stabilization, the ends which overlap with the two parts 32, 32' are welded one to the other.

However, the invention is not restricted to these embodiments, since other variants can be conceived.

For example, in the case shown in FIG. 4, the lateral ends 31, 31' of the arch 3 are connected by means of a transverse plate 33 welded to the lower edges 43 of the longitudinal plates 4, 4'. In this way, each metal section is constituted by an arch 3 whose ends are connected by a base 33 resting on the ground. The slab 2 is then positioned inside the closed metal wall thus formed, and is advantageously poured inside the formwork thus constituted by the lower part of the metal structure.

Furthermore, the arch 3 can be made in a single unit, as shown in FIG. 1, the curved half-cylindrical part 3 being simply extended beyond its lateral ends 31, 31' using flat elements which constitute the two longitudinal attachment plates 4, 4'. Each half-shell then forms, in conjunction with its two flanges 4, 4', a one-piece assembly covering the entirety of the transverse section.

However, to facilitate transport, in particular in the case of large sections, it may be preferable to make the metal element in several parts, i.e., a central curved arch-shaped element 33 and the two longitudinal plates 4, 4', respectively, whose largest portion is pressed against the lateral faces 23, 23' and whose upper edges 40, 40' are connected and attached by weld seams 35 to the lower lateral edges of the central element 33. The weld seams 35, 35' may be placed at the lateral ends 31, 31' and at the transverse plate 32. In this case, the curved wall 33 covers the entirety of the arch.

However, the weld seams 35, 35' may also be positioned at a distance above the lateral ends 31, 31', each longitudinal plate 4, 4' then comprising a lower flat attachment part and an upper curved part 40, 40' which attaches tangentially to the arch 33.

Figure 7:
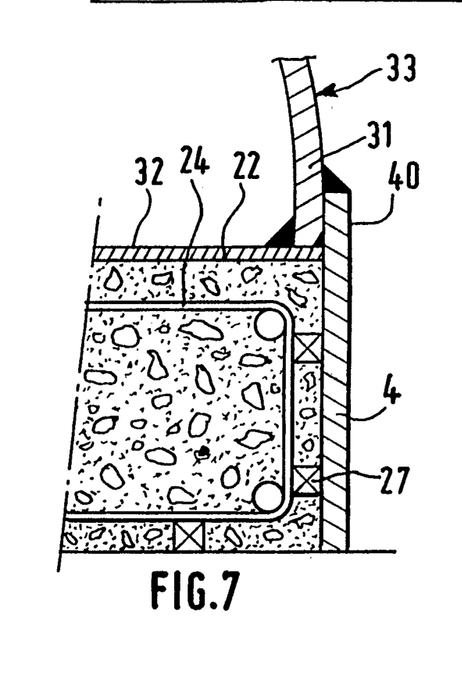
FIG. 7 is a detail view of a special method for mounting the arch.

The connection and the weld seam can be effected edge to edge, as indicated in FIGS. 2 and 5. It is also possible, however, to provide for overlapping of each lateral end 31, (31') of the arch by the upper part 40, (40')of the plate 4, (4'), as shown in FIG. 7. This configuration facilitates the positioning and centering of the arch 3, as will be made clear later.

The two longitudinal plates 4, 4' may be connected in advance to the transverse plate 32, so as to form a one-piece metal assembly 36 having a rectangular transverse section, which may advantageously be used as formwork for making a slab component, in the manner shown in FIG. 6.

In fact, as indicated in the left-hand portion of FIG. 6, the metal assembly 36 thus formed can be turned over so as to constitute a mold whose bottom is the transverse plate 32 and whose sides are the two plates 4, 4', the two other sides being capable of being closed by movable panels.

The iron framework 24 and, as the case requires, tubes 53' opening into holes 41, 41' provided in the elements 34, 34' are placed in the mold 36 thus formed. The concrete 25 is then poured.

The horizontal plate 32 has preferably been fitted, on its face turned toward the inside of the mold, with projecting fastening elements intended to attach the plate to the concrete 25.

Similarly, it has been possible to place shaped sections 42 preliminarily on the interior faces of the plates 4, 4' so as to be incorporated into the concrete when the slab 2 is poured.

After the concrete has hardened and the end panels removed, a prefabricated slab component 20 is produced, bounded on two lateral sides and on a horizontal face by the longitudinal plates 4, 4' and the transverse plate 32. Sling-fastening elements can have been provided, for example on the plates 4, 4', so as to allow the component 20 to be handled.

Each slab component 20 thus prefabricated is thus fitted preliminarily with the transverse plate 32 and the two longitudinal plates 4, 4', on which an arch component 33 can be laid and welded, as illustrated in the right-hand portion of FIG. 6.

These various configurations make it possible to manufacture, as work progresses, a pipeline under particular advantageous conditions, which will now be described with reference to FIGS. 8, 9, 10, and 11, which illustrate, diagrammatically, the different steps involved in the construction of a pipeline according to one or the other of the embodiments previously described.

Figure 8:
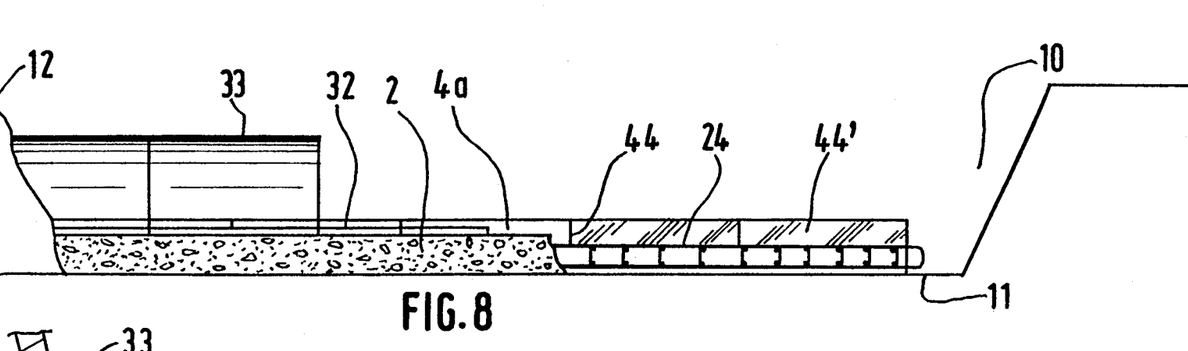
FIGS. 8, 9, 10, and 11 illustrate diagrammatically the successive steps for construction of a pipeline in accordance with different processes, each of which is adapted to one of the embodiments of the enclosure.

FIG. 8 illustrates the construction of a pipeline utilizing the most widely used embodiment, shown in FIG. 1.

To make a buried pipeline, the ditch 10 is first dug over a certain length, by producing a levelled, closely-packed bottom 11, which can be covered with lean concrete 15 or with a protective sheet made of a non-woven fabric.

The slab 2 is poured as work progresses using conventional means, e.g., those used for concreted roads.

The iron framework 24 is, first, laid between two panels belonging to the lateral formwork, which are advantageously constituted by the attachment plates 4, 4' themselves. As shown in FIG. 7, these plates can be held in place by the iron framework 24 using support devices 28. Moreover, each new plate 4 is attached, by means of its rear vertical edge 44, to the corresponding front edge of the last plate 4a cemented to the end of the slab thus built.

The following portion of the slab 2 is then poured between the plates 4, 4', then the transverse plates 32 are put in place by welding the rear transverse edge of each to the preceding plate and by welding its lateral edges to the attachment plates 4, 4'.

The plates 32 and the plates 4, 4' can be fitted, on their interior faces, with anchoring devices which form the attachment with the slab 2.

After the concrete has hardened, the plates 4, 4' may be pressed under pressure against the lateral faces of the slab 2, using anchoring bolts or tension bars 5.

The installation of the arch components 33 is then continued on the lower portion of the enclosure thus produced.

As already indicated, the plates 4, 4' advantageously extend above the level of the upper face 22 of the slab 2, since their upper parts 40 then form centering edges which facilitate the installation of the arch component 33. The latter is then welded to the last arch component already laid in place along a transverse joint and to the attachment plates 4, 4', and, as the case may require, the transverse plate 32, along its lateral ends 31, 31'.

As construction progresses, the part already laid can be buried beneath the fill 12, and the ditch can be dug over a new length.

It will be noted that the enclosure is constituted solely by the slab, which is poured in place as work continues, and by metal panels which can be easily transported to the worksite. These panels can manufactured and formed in the shop, or else on site using a bending press installed in proximity to the worksite, or even directly on the slab already concreted.

This embodiment is thus especially logically conceived and allows rapid, reliable laying of the tubular enclosure.

Of course, different various can be contemplated within the scope of the invention.

First, as illustrated in FIG. 1, each arch component 3, which is extended tangentially by the two longitudinal plates 4, 4', can be made in one piece, and potentially shaped on site.

Figures 9, 10:
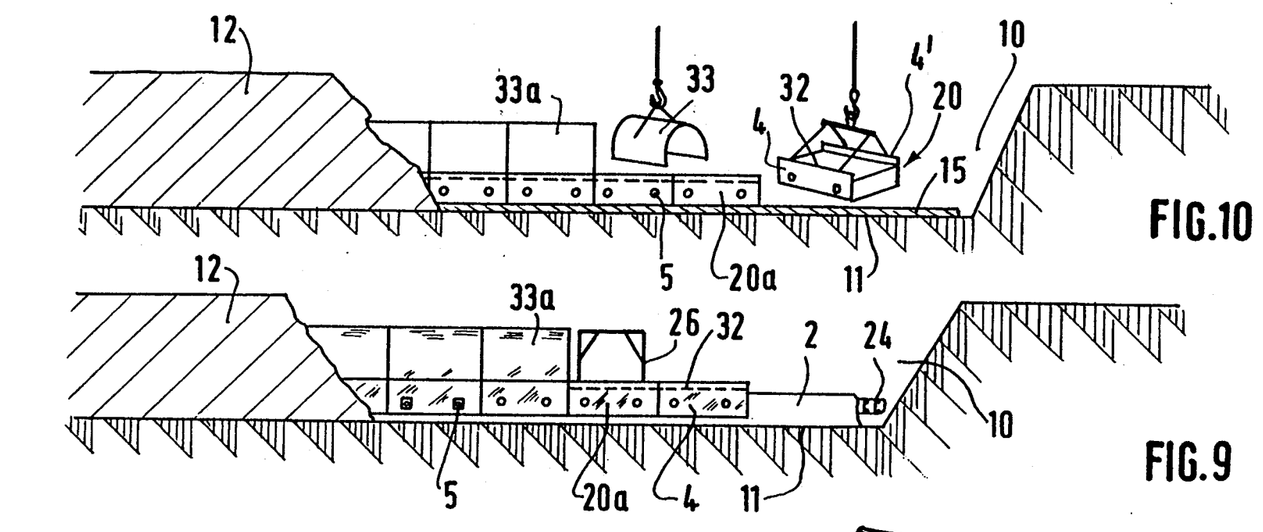

Furthermore, while it is advantageous to use the two longitudinal plates 4, 4' as the formwork, the slab may also be poured between two temporary formworks, as illustrated in FIG. 9.

After the concrete has hardened, the attachment plates 4, 4', which can, moreover, be assembled in advance to the transverse plate 32 so as to form a box which covers the slab 2, is laid on the slab 2. This box can slide along the slab so as to become aligned with the last component 36a already laid in place. The weld seam joining the edges opposite the lateral panels 34, 34' and the transverse plates 32 is then made.

The arch component 33 is then laid, by welding it to the upper edges of the lateral panels 34, 34' and to the front edge of the last arch component 33a of the part previously laid.

Of course, it may prove advantageous to make the transverse plate in two parts 32, 32', in the manner illustrated in FIG. 6.

If the dimensions of the arch component 33 are such that there is a risk that this component will go out of round when it is laid, use may be made of a temporary templet 26, which rests on the slab 2 and makes it possible to provide for the unimpaired connection of the edges of the arch components 3 and 3a.

Next, the prestressing bars 5 are then laid and placed under tension.

In this case, the resistance of the slab 2 to differential settling phenomena is provided by its iron framework 24, and, as required, by longitudinal prestressing bars.

The fill 12 can then put in place.

The same laying procedure can be used when the metal portion of each section forms a one-piece assembly comprising the arch 3, extended by the two attachment plates 4, 4' and welded in advance to the plate 32.

Figure 11:
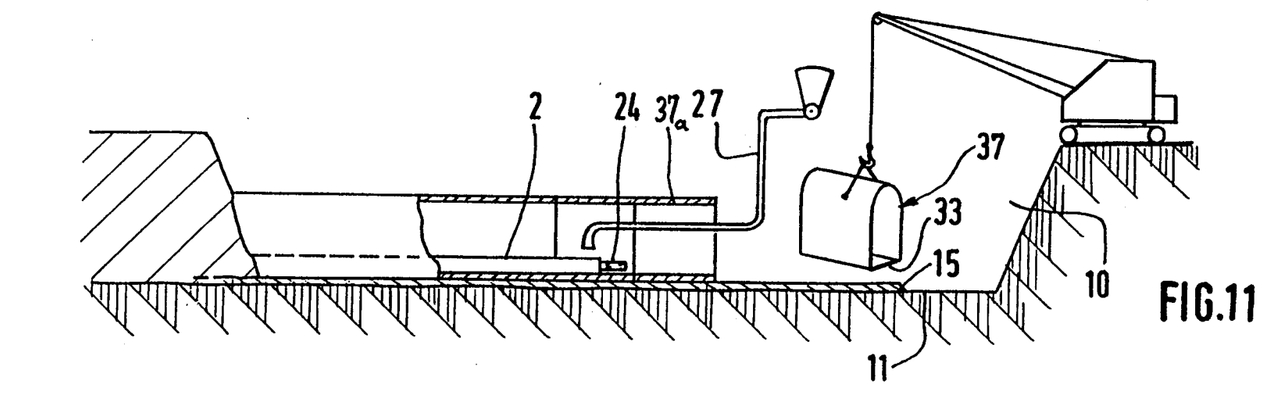

However, when implementing the embodiment shown in FIG. 4, it is advantageous to pour the slab as work progresses, as illustrated in FIG. 11.

In this case, after digging the ditch 10 over a determinate length and preparing the installation surface 11 and potentially covering it with a lean concrete 15, the different metal sections are laid in succession, each of the latter forming a one-piece assembly 37 constituted by the arch 3, which is extended by the attachment plates 4, 4', whose lower edges are connected by means of the lower plate 33.

After laying a component 37, it is aligned with the last component 37a of the metal part previously laid; it is then attached by a weld. In this way, a metal tube having a flat base is thus produced, in which the lower part may constitute a lost formwork in which an iron framework 24 is positioned; next, the concrete is poured, for example, by utilizing a duct 27 fed by a concrete pump.

The slab 2 may be also formed from prefabricated elements laid in succession, especially when using the embodiment shown in FIG. 6, in which the two longitudinal plates 4, 4' assembled in conjunction with the transverse plate 32 create a lost formwork allowing pouring of the slab component.

This construction method is illustrated diagrammatically in FIG. 10.

To make a new section of the enclosure, a slab component 20 is first laid, which is aligned with the last component 20a of the part already formed, and the edges opposite the plates 4, 4' and the transverse plates 32 which form extensions of each other are welded together.

The prestressing bars 5 are then laid and put under tension.

Finally, the arch component 3 is laid and welded, along its lower edges, to the side elements 34, 34' and, along its rear edge, to the front edge of the arch component 3a of the last section of the part of the pipeline previously laid.

When a determinate length of pipeline has been produced, it can be covered with fill 12.

Accordingly, the laying procedure can be pursued in successive steps by digging the ditch 10, then reclosing it as construction of the pipeline advances.

The welded connection of the metal, parts of the successive components provides fluid-tightness of the pipeline and attachment of the various sections. However, the slab components can also be attached longitudinally, for example by using longitudinal prestressing bars laid and put under tension as the work progresses, so as to provide more effective assembling of the slab which makes it possible, in particular, to resist differential settling phenomena and to avoid risks of cracking.

A similar installation procedure can be implemented, as shown in FIG. 4, in which the transverse plate forms the lower face of the slab. In this case, it no longer proves necessary to turn the slab component over after pouring the concrete; the upper face 22 of the slab is then directly in contact with the circulating fluid.

In some cases, moreover, such as that illustrated in FIG. 1, it may be thought useless to connect the lateral ends 31, 31' of the arch by means of a transverse plate. A fluid-tight device must then be provided between the different slab components, when the latter is constituted by prefabricated components laid end to end.

Figure 12:
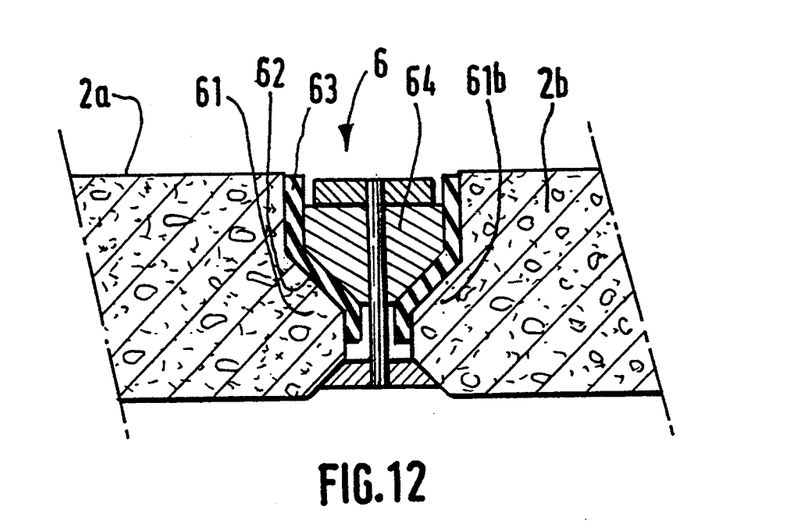
FIG. 12 illustrates, in longitudinal cross-section, a transverse joint between two prefabricated slab components.

As an example, FIG. 12 illustrates an especially advantageous fluid-tight system.

Each transverse fluid-tight joint 6 between the longitudinal ends of two successive components 2a, 2b of the slab is then formed by projecting elements 61 bounded by inclined surfaces 62, so that two projecting ends 61a, 61b form between them a V-shaped groove opening upward. Furthermore, the two faces 62a, 62b are covered with a fluid-tight sheet made of a deformable material 63.

After the two successive components 2a, 2b of the slab 2 are laid, a transverse part forming a wedge 64, whose shape is paired with the shape of the faces 62a, 62b, is inserted in the V-shaped groove thus formed, and the wedge 64 is tightened by means of easily-designed devices, e.g., threaded shafts supported, on one side, on the wedge, and, on the other, on the two components 2a, 2b.

An excellent fluid-tightness can thus be achieved between two successive slab components 2a, 2b, even when sheet metal is absent.

Other variants or improvements could also be imagined while remaining within the scope of protection delineated by the claims.

Figure 13:
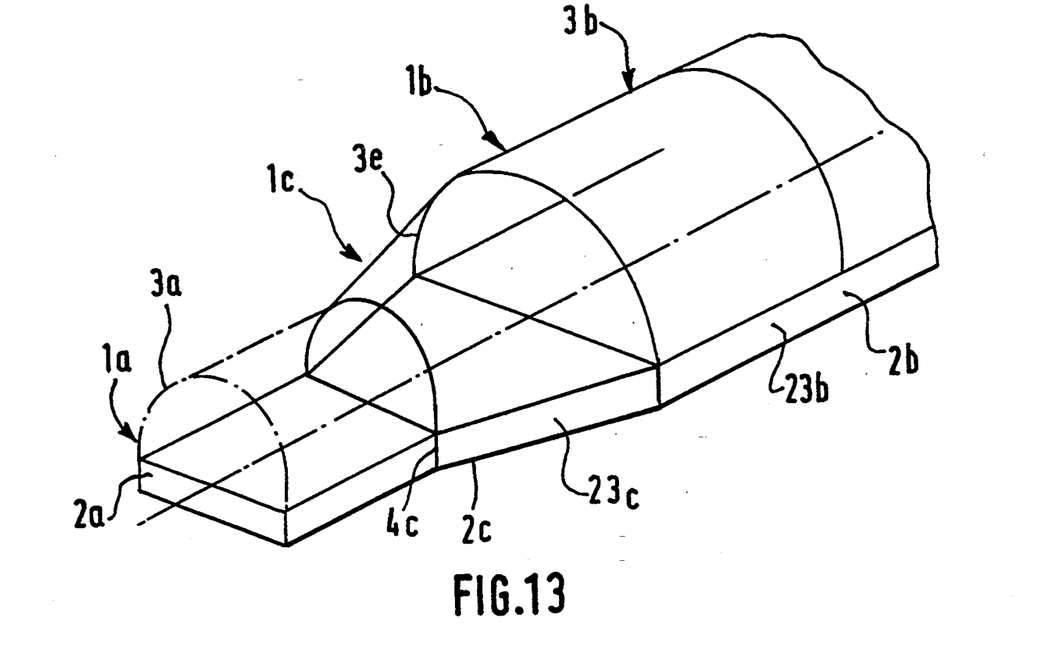
FIG. 13 is a perspective view of a special embodiment allowing progressive change of section.

For example, progressive changes of section can easily be effected in the manner shown in FIG. 13.

The pipeline 1a formed by a slab 2a and an arch 3a is connected, in this case, by means of an intermediate part 1c, to a pipeline 1b formed by a slab 2b of greater width and by an arch 3b of greater diameter. This intermediate part is constituted by a slab 2c whose lateral faces 23c spread progressively apart so as to be connected to the lateral faces 23b of the slab 2b. Similarly, the arch 3c has a slightly tapered shape so as to provide for the junction between the arches 3a and 3b of different diameters. However, as in the other instances, the arch 3c is extended by attachment plates 4c which are pressed on the lateral faces 23c of the slab 2c.

It will be seen that all of the embodiments described previously can be made applicable to the tapered element 1c.

This configuration thus makes it possible to increase or reduce progressively the section of flow of the pipeline, but it could also be used to change the height and width of the arch, while preserving the section of flow, for example, in order to adhere to a maximum or minimum level or to flow into a narrowed space.

Furthermore, in all of the embodiments previously described, the enclosure incorporates a half-circular cross-section to obtain optimal resistance to crushing; however, this is not indispensable, since other cross-sections can prove advantageous in some cases.

Figures 14, 15:
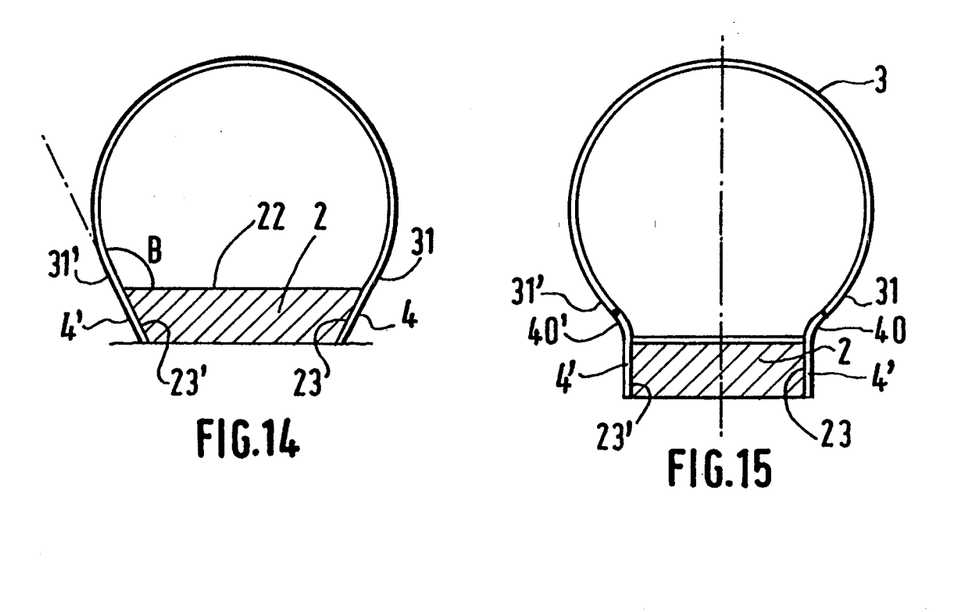
FIGS. 14, 15, and 16 illustrate, in transverse cross-section, other embodiments of the invention.

For example, in the case shown in FIGS. 14 and 15, the metal arch 3 forms a surpassed arc, the upper face 22 of the slab 2 being offset downward in relation to the axis of the circular section. This arrangement can prove advantageous for very large sections, since it allows the width of the concrete slab to be reduced, and, in consequence, the slab to be lightened, given that the flexure stresses are less pronounced.

In the case shown in FIG. 14, the planes tangent to the arch 3 along its lateral ends 31, 31' form obtuse dihedrons B with the upper face 22 of the slab 2, and the lateral faces 23, 23' of the slab are inclined by the same angle, so that the attachment plates 4, 4' extending tangentially within the extension of the lateral ends 31, 31' are each pressed against the inclined faces 23, 23'.

In the case shown in FIG. 15, the lateral faces 23, 23' of the slab 2 remain vertical, but each longitudinal plate 4, 4' comprises a lower flat portion pressed from the outside against the lateral face 23, 23', and an upper part 40, 40' curving to the outside so as to be connected tangentially to the corresponding lateral end 31, 31' of the arch 3.

It can be seen that the different embodiments previously described are applicable to the cases in FIGS. 14 and 15, and give the same advantages.

The invention as just described will give rise to multiple applications, not only for producing pipelines for pressurized fluid transport, whether buried or not, but also for the construction of expansion or shock-absorption chambers in hydraulic or pneumatic systems, for the storage of pressurized gases or fluids, and, in general, under all circumstances in which an elongated enclosure can be subjected, simultaneously or in alternating fashion, to internal or external forces.

Furthermore, all of the embodiments previously described apply to cases in which the pipeline rests on an installation surface preliminarily prepared, even if the use of a concrete slab makes it possible to absorb, as required differential settling phenomena.

Figure 16:
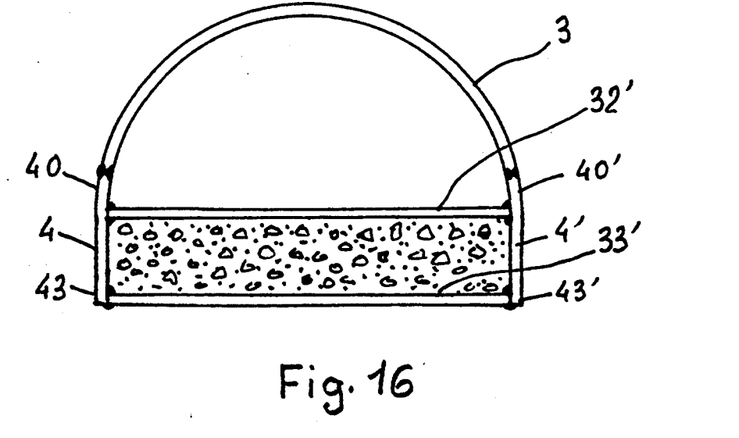

However, the applications of the invention could also be extended by utilizing the embodiment shown in FIG. 16, which is a transverse cross-section of an enclosure thus perfected.

In this case, the two longitudinal plates 4, 4' are, in effect, connected by means of two transverse plates separated one from the other, i.e., a lower plate 33' attached to the lower edges 43, 43', and an upper plate 32' attached to the upper ends 40, 40' of the two longitudinal plates 4, 4', respectively.

The assembly formed by the two longitudinal plates 4, 4' and the transverse plates 32', 33' forms a sealed box having a rectangular section, which is filled with concrete so as to constitute the slab 2.

To ensure the adhesion among the four plates bounding the box and the concrete 20, the latter is advantageously poured so that there remains slight pressure after hardening and possible shrinkage. Furthermore, the interior faces of the four plates can be fitted with means such as striae or steps, to improve adhesion.

This metal box can be produced as construction proceeds over a determinate length, as in the case shown in FIG. 11, the concrete being injected inside the box under a specific pressure.

Prefabricated sections can also be produced in advance in a manner analogous to that described with reference to FIG. 10. In fact, the four plates 4, 4', 32, 33' are first assembled and welded so as to form a box in which the concrete is poured under low pressure. After hardening, the prefabricated boxes are positioned in succession one after the other, by welding the rear edges of the four plates of the new component to the front edges of the last component previously laid in place. After welding, a mortar can be injected under pressure in the transverse joint between two successive slab components.

In general, in this embodiment the technique termed "confined concrete," which gives multiple advantages, is implemented.

In particular, no iron framework need be incorporated inside the concrete slab, since this slab is reinforced using the metal walls of the box. Consequently, the slab 2 can withstand, longitudinally, both negative and positive moments of flection.

Accordingly, this pipeline can rests on spaced supports, and not merely on a continuous installation surface. This embodiment can, therefore, be advantageously used in the case of pressure pipelines, in mountainous terrain, and also in all cases in which the ground does not make it possible to prepare a resistant foundation surface, for example, on the bottom of a river.

It will be noted that, in this case, the lower plate 33', which serves as a frame and is subjected to appreciable traction stresses, will normally be thicker than the upper plate 32, which is intended to close the box and provide fluid-tightness.

The references inserted after the technical features mentioned in the claims are intended solely to facilitate understanding of these features and in no way restrict their scope.

What is claimed is:

1. Elongated enclosure (1) designed to withstand internal pressure capable of exceeding 10 bars, and resting on a ground, said enclosure comprising:
   (a) a rigid concrete slab (2) capable of withstanding flection and comprising a lower face (21) resting on the ground, an upper face (22) and two lateral faces (23) parallel to said longitudinal axis;

(b) a water-tight sealed parallel tubular space (A) having a truncated transverse section extending along a longitudinal axis and constituted by thin metal wall elements welded together and forming closed sections laid end to end, each section comprising an upper part forming a curved arch (3) between two lateral ends (31, 31') extended tangentially by two flat plates (4, 4') and at least one thin horizontal plate (32) having two parallel longitudinal edges attached rigidly and in watertight fashion respectively along each lateral end of said arch (3) for sealing said tubular space (A);

(c) said upper face (22) having a width substantially equal to the space separating said two lateral ends (31, 31') of said curved arch (3);

(d) said at least one horizontal plate (32) covering at least one of said upper (22) and lower (21) faces of said slab (2);

(e) said flat plates (4, 4') extending respectively along said lateral faces (23) of said slab (2); and (f) means for attaching said flat plates (4, 4') respectively to the corresponding lateral faces (23) of the slab (2) with a pressure at least sufficient to prevent shifting of each of said plates (4 4') long said corresponding lateral face (23, 23') of said slab (2) under the effect of stresses (15) generated by internal pressure and to prevent detachment of said plates (4, 4') under the effect of external stresses.

2. Elongated enclosure according to claim 1, wherein said arch (3) is constituted by prefabricated longitudinal sections (3*a*, 3*b*) placed in succession one after the other, each arch section (3) being made in one piece comprising a central half-shell-shaped part constituting the arch (3), and extended on each side, by a substantially flat part constituting said attachment plate (4, 4').

3. Elongated enclosure according to claim 1, wherein said arch (3) substantially covers a half-circle centered substantially at the level of said upper face (22) of said slab (2).

* * * * *